Nov. 29, 1949     J. C. HOBBS     2,489,292
PIPE STRAINER
Filed July 13, 1945     2 Sheets-Sheet 1
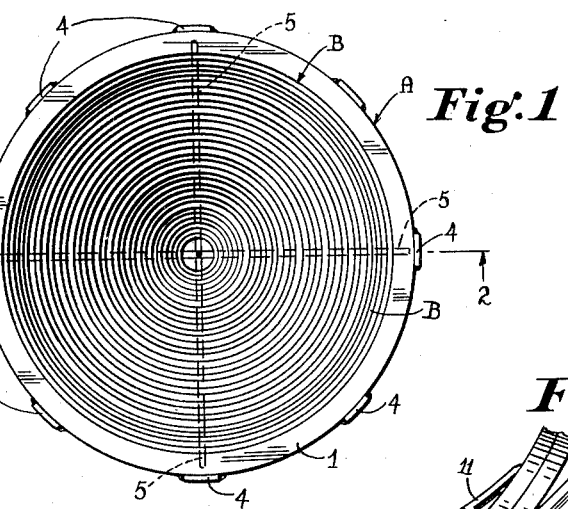
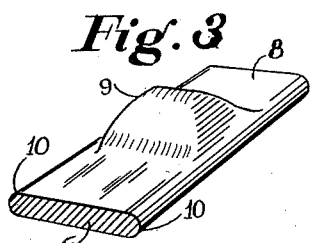
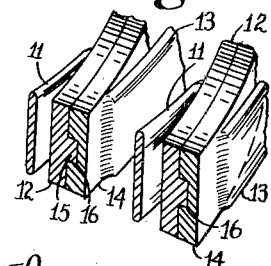
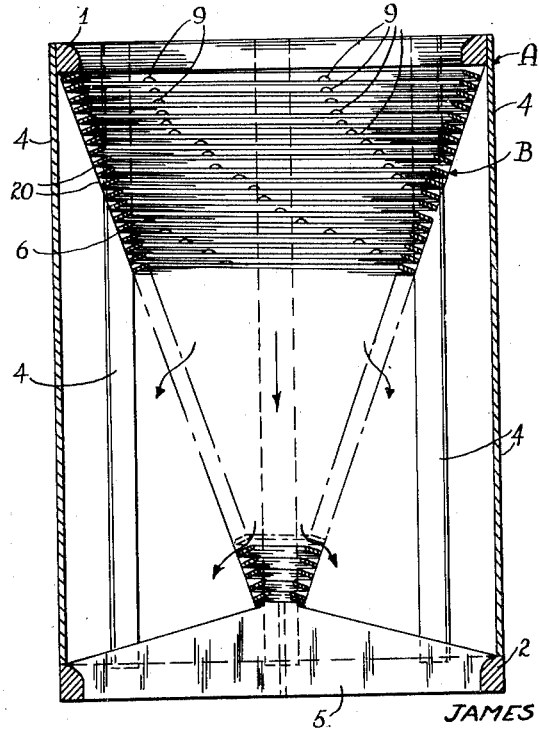
INVENTOR.
JAMES CLARENCE HOBBS
BY
Richey & Watts
ATTORNEYS Nov. 29, 1949          J. C. HOBBS                2,489,292
                      PIPE STRAINER
Filed July 13, 1945                           2 Sheets-Sheet 2

INVENTOR.
JAMES CLARENCE HOBBS
BY
Richey Watts
ATTORNEYS

Patented Nov. 29, 1949

2,489,292

UNITED STATES PATENT OFFICE 2,489,292

PIPE STRAINER

James Clarence Hobbs, Painesville, Ohio

Application July 13, 1945, Serial No. 604,860

7 Claims. (Cl. 210—169)

The present invention relates to pipe strainers and more particularly to a new strainer for steam-pipe lines.

It is important to provide strainers in steam lines to prevent solid articles from being carried by the steam into apparatus into which the steam is delivered. For example, all solid articles which could damage a turbine must be removed from the steam before it contacts with the turbine blades. Pipe strainers for steam lines which have been used heretofore required a special housing, that is, they could not be placed within the pipe itself; were heavy and complicated in structure; were expensive and unreliable; were difficult to clean; and had low, free area ratios, in some instances as low as 11% or 12%.

The present invention aims to provide a simply constructed, reliable, inexpensive, light weight strainer which has a high, free area ratio, in some instances as high as about 60%, and which can be housed within the pipe line or valve. These aims are achieved by the combustion of a skeleton or cage structure composed of a few simple parts and a filter having a plurality of narrow, elongated passages thru which steam, free from solid articles of predetermined sizes, may pass with a minimum of resistance.

The present invention will be better understood by those skilled in the art from the following description and the drawings which form a part of this specification and in which Figure 1 is an end elevation of one embodiment of the present invention;

Figure 2 is a central sectional view taken on line 2—2 of Fig. 1;

Figure 3 is a perspective view of the filter forming member of the strainer of Figs. 1 and 2;

Figure 4 is a fragmentary perspective view of an alternative form of filter;

Figure 7 is a fragmentary, cross-sectional view of a modified form of filter forming member.

Figure 5:
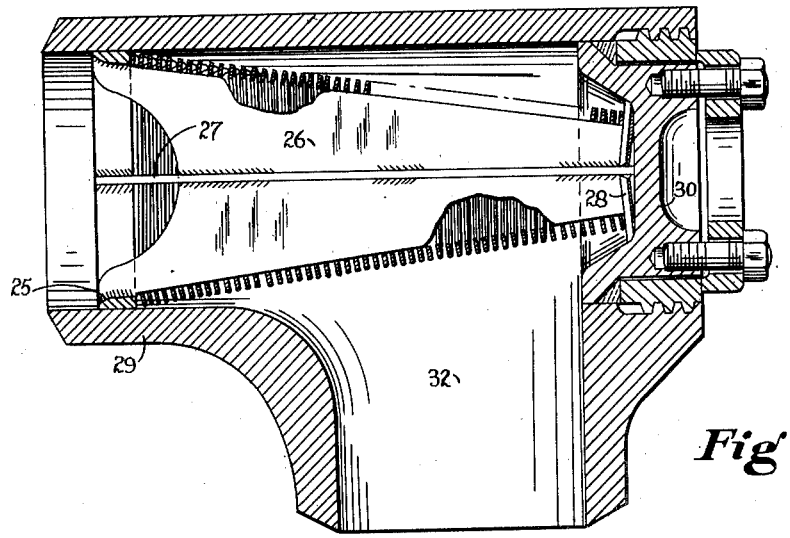
Figure 5 is a central sectional view, partly in elevation, of a modified form of apparatus embodying the present invention.

The strainer of Figs. 1, 2 and 3 comprises a skeleton or cage A and filter B. The cage consists of axially spaced end rings 1 and 2 connected by a plurality of circumferentially narrow plates or bars 4 which are welded or otherwise suitably secured to the rings, and a plurality of radial bars 5 secured within ring 2. Bars 5 increase in width from the ring 2 toward the center thereof. It will be understood that the skeleton A may have an outside diameter of such a size that it may be readily slipped into place within a steam line, and that, as will be shown later herein, it need not be substantially cylindrical but may be of various frusto-conical shapes and the slopes of the cones may vary between wide limits, as those skilled in the art will understand. I have used in the appended claims the term "tubular" to mean and include both these cylindrical and frusto-conical shapes.

The filter B is frustro-conical in shape, is disposed within, attached to, and supported by cage or skeleton A, and consists of a plurality of spaced apart turns or coils of a metallic ribbon 6 which is thin and wide and is disposed with its sides extending substantially transversely of the filter axis in spaced relationship to provide filtering passageways. The sides of this ribbon, which consists of a substantially flat body having rounded ends, have smooth surfaces and opposing surfaces of adjacent coils are spaced apart to define passages having larger outlet areas than inlet areas. The ribbon is also provided with spacers 9 projecting from one side of surface 8 for engagement with the opposing side surface of the adjacent coil. With the outer rounded ends of the adjacent coils in alignment, the maximum space between said coils is of less dimension than the length of the said side surfaces. The height of spacers 9 depends on the minimum size of the solids which are to be separated from the steam. For example, when such solids are greater than $\frac{3}{32}$" the spacers may be $\frac{3}{32}$" in height and the body 8 may be $\frac{1}{32}$" thick and $\frac{5}{16}$" wide.

The ribbon 6 may be made conveniently by passing a round wire or rod between a smooth faced roll and a roll having indentations corresponding to the desired spacers.

The end turn of ribbon 6 is preferably secured to ring 1 by welding but other attaching means may be used if desired. The opposite end turn of ribbon 6 bears against bars 5 of ring 2 and may be attached thereto, if desired, by welding or otherwise.

Filter B may be made by coiling ribbon 6 on a suitable form, such as a collapsible mandrel, with the spacers of one turn bearing against the flat surface of an adjacent turn, and then assembling cage A therewith and attaching it thereto before the mandrel is removed.

While the ribbon 6 of Fig. 2 is a single piece, it is obvious that a plurality of short pieces may be used, especially when it is desired to provide for replacement of broken ribbon. In such event, plain rings may be welded to adjacent turns of separate ribbons and separably connected to each other in any suitable manner as, for example, by the notch and lug engagement of Fig. 4. In that figure an end turn 11 of one ribbon is welded to ring 12 and the end turn 13 of an adjacent ribbon is welded to ring 14. Ring 12 has lugs 15 to engage in notches 16 of ring 14. The number of plain rings in the filter will, of course, be determined by the number of separate pieces of ribbon comprising the filter. Thus where three separate ribbons make up a filter, there will be in addition to the end rings 1 and 2, two pair of plain rings, the adjacent free ends of the two ends of the two end sections of ribbon being attached to rings of the notch type and the ends of the central section of ribbon each being secured to a ring of the lug type, and these notch and lug type rings being engaged as indicated in Fig. 4. In such an arrangement the free area ratio of the filter is, of course, reduced by the width of the plain ring sections. Where a great number of separate pieces of ribbon thus comprise a filter, the effective free area of the filter will be relatively low because of the numerous plane rings incorporated in the filter.

As will be noted from Fig. 2, the turns of ribbon 6 define passages 20 which are only as wide as the height or axial length of spacers 9, but are as long circumferentially as the distance between adjacent spacers. Since the spacers are narrow, the passages between each pair of turns of the ribbon are nearly 360° in circumferential length. Such length is reflected in high free air ratio. When the ribbon is half as thick as the height of the spacers and the spacers are some distance apart, the free air ratio may exceed 60%.

Since filter B is conical, each turn of the ribbon projects inward slightly beyond the preceding turn and is inclined at an angle to the axis of the filter. Steam flowing thereinto from the top side of Fig. 1 will successively engage the edges of those turns which will, in effect, successively peel off the outer surface layers of the stream of steam and change the direction of flow at an acute angle. In this manner turbulence and back pressure are largely avoided. Since the turns of the ribbon are positioned on edge, the forces exerted by the steam are resisted by the width of the ribbon. Consequently, the ribbon may be thin and yet possess sufficient strength to withstand differential steam pressures on opposite sides without the use of additional brace or strengthening means.

It will be understood that filter B need not be conical or, if conical, it need not have the steep side angles shown in Fig. 2. However, when it is more nearly cylindrical, it should be used in a housing having a space around the filter which is large enough to accommodate the steam which flows thru the filter without imposing substantial back pressure on the steam.

The modification of the present invention which is shown in Fig. 5 may be used within an ordinary straight steam pipe, but as shown, is positioned in a pipe angle. The skeleton of the strainer of Fig. 5 consists of an end ring 25, a diametrical, tapered plate 26 secured as by welding or in any suitable manner at one end of ring 25, and radial, tapered plates 27 similarly connected at one end to ring 25 and also connected, as by welding or otherwise, along their inner edges to plate 26. A disk 28 is connected to the opposite ends of plates 26 and 27 as by welding or otherwise. Ring 25, plates 26 and 27 and disk 28 form a skeleton support for the filter. A ribbon, such as that shown in Fig. 3, surrounds plates 26 and 27 and one end turn is welded or otherwise secured to ring 25 and the other end turn is similarly connected to disk 28. In this instance ring 25 is of such a size as to be slid into place within angle pipe 29 and disk 28 bears against plug 30 in the pipe. The outlet of the angle pipe 29 is indicated at 32. This outlet may be of various types, including the angle, Y, and globe types.

Figure 6:
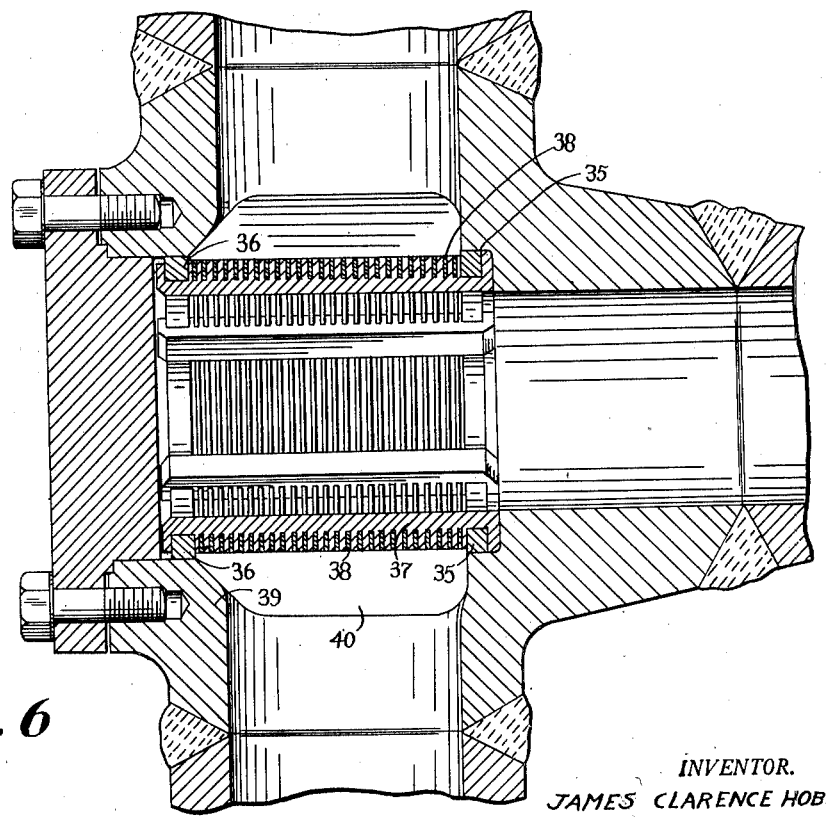
Figure 6 is a central, sectional view, partly in elevation, of another modified form of the invention.

The modification of the present invention, which is shown in Fig. 6, comprises a skeleton consisting of end rings 35 and 36, circumferentially spaced, narrow plates 37 attached at their ends to rings 35 and 36, and a filter consisting of thin rings 38 mounted in recesses in the outer edges of plates 37. In this modification the strainer is shown in a housing 39 having an enlarged space 40 surrounding the strainer so that steam which enters the interior of the strainer will not be subjected to high back pressure by steam which has passed thru the strainer.

It will be understood that the notches in bars 37 may vary in depth. If desired, these notches may be deep enough to extend from the inner edges to the outer edges of the rings 38 or only deep enough to extend far enough along the sides of the rings from their inner edges to maintain them in predetermined position. When the outer edges of the rings are substantially flush with the outer edges of bars 37, weld metal may be applied to the outer edges of the rings and bars to secure the rings in place in the notches. When shallower notches are used the rings and bars may be connected by weld metal disposed along the sides of the bars at the inner edges of the rings. Any other suitable means for securing the rings in place and bars may be employed if and when desired.

The ribbon 50 of Fig. 7 differs from that of Figs. 2, 3 and 4, in that the side surfaces thereof converge in the direction of flow through the filter so that adjacent turns or coils define a space 51 which enlarges in said direction of flow, thus affording a definite Venturi effect. Also, this Fig. 7 ribbon has thickened, rounded ends, but it resembles the Fig. 2 ribbon in that its sides extend substantially transversely of the filter axis in spaced relationship to provide filtering passages. The said thickened, rounded ends of adjacent coils of this ribbon are disposed in alignment wherein the maximum spacing between the adjacent coils is of less dimension than the length of the converging sides. Thus, in both of these ribbon filter constructions adjacent turns of the ribbons define spaces which have some Venturi action on fluids flowing therethru, and the strainer has the definite advantage of less pressure loss for a given face area of fixed minimum operating dimension due to the Venturi shape of the space between turns of the ribbons as compared with square edge rings or ribbons or round wire. The ribbon of Fig. 7 possesses these advantages to a greater extent than the Fig. 2 ribbon because of the more pronounced convergence of the sides of the ribbon and the correspondingly greater divergence of the opposite faces of the adjacent coils of the ribbon.

When the liquid flow is from the inside to the outside of the filter, passages 51 give the greatest Venturi effect and when the flow is from the outside to the inside of the filter these passages still give a Venturi effect because their exit end areas are greater than their throat areas. Passages in generally cylindrical filters such as shown in Fig. 2 have smaller exit end areas than throat areas and hence give jet effects instead of Venturi effects, on fluids flowing from the outside to the inside of such a filter. Where the flow is from the inside of this latter filter, however, a Venturi effect, rather than a jet effect, is obtained as indicated above.

The several modifications of filters herein shown and others embodying the present invention are characterized by having fluid passages which are narrow enough to prevent articles of above a predetermined size from moving therethru, are long enough radially when considered with the differences in circumferential lengths of their inner and outer ends to have a Venturi effect on fluid moving therethru and are capable of converting a substantial part of the velocity head of the fluid in the throats of the passage into useful static pressure to such an extent that the static pressure on the outside of the filter may equal or even exceed the static pressure of the fluid on the inside of the filter. This high useful outside static pressure results from the fact that the passages are substantially filled with stream lined flow of fluid having little or no turbulence which could convert kinetic energy into heat. This is an entirely unique result as those skilled in the art will understand, prior strainers of this type having invariably resulted in reduction of both the static head and the velocity head of fluid passing therethrough to the extent that a substantial differential obtains at all times across the filter and the static pressure in the discharge side is always materially less than on the inlet side. At first blush this might seem to be an impossible result and a contradiction of natural laws, but actually energy is not created in accordance with this invention, but rather is conserved to an extent not heretofore known or believed possible in this art. The small loss of energy encountered in the use of the present strainers is reflected in a decreased velocity head while the static pressure is undiminished or even increased.

In prior strainers in which the filter consists of a plate with punched holes, the holes were of short radial length and their inner and outer ends were so nearly of the same area that substantially no Venturi action was present and considerable turbulence existed. The outside static pressure was considerably less than the inside static pressure. Filters consisting of round woven wire also have high turbulence and eddy losses for the same reasons and correspondingly lower useful static pressure outside of the filter.

It will be understood from the drawings and the foregoing description that strainers embodying the present invention are light in weight, high in strength, and low in cost. Also they are reliable, easy to install, remove, repair and clean and do not require special housings for they may be housed within a valve, pipe or angle. These properties and characteristics are traceable in part to the skeleton structure and the thin members which are mounted on edge and define narrow steam flow spaces which are of greatly extended circumferential length.

While the present invention has been described specifically in connection with a steam strainer, it is to be understood that the invention is applicable to other fluids, such as other gases, and, if desired, to liquids provided the skeleton and filter are made of sufficient strength to withstand the forces exerted thereon by the liquid.

Having thus described my invention so that others skilled in the art may be able to understand and practice the same, I state that what I desire to secure by Letters Patent is defined in what is claimed.

What is claimed is:

1. A strainer comprising a skeleton supporting member and a tubular filter element supported thereby, a coiled filter element including a metal structure comprising thin ribbon members each having in cross section an enlarged rounded end portion and side surfaces which extend convergingly therefrom substantially transversely of the filter axis, adjacent coils of said ribbon structure being arranged in flatwise spaced relationship to provide filtering passages, said side surfaces converging in the direction of flow therethrough from the point of maximum cross-section, the enlarged ends of adjacent coils being in alignment, and the points of maximum cross-section of adjacent coils being substantially aligned and so arranged that the maximum spacing between adjacent coils is of less dimension than the length of the converging side surfaces, thereby providing a Venturi passage having a short inlet portion, and an exit portion which gradually diverges from a throat formed at the point of maximum cross-section of adjacent coils.

2. A strainer comprising a skeleton supporting member and a tubular filter element supported thereby, a coiled filter element including a thin metal ribbon member having in cross-section an enlarged rounded end portion and side surfaces which extend convergingly therefrom substantially transversely of the filter axis, adjacent coils of said ribbon member being arranged in flatwise spaced relationship to provide filtering passages, said side surfaces converging in the direction of flow therethrough from the point of maximum cross-section, the enlarged ends of adjacent coils being in alignment, and the points of maximum cross-section of adjacent coils being substantially aligned and so arranged that the maximum spacing between adjacent coils is of less dimension than the length of the converging side surfaces, thereby providing a Venturi passage having a short inlet portion, and an exit portion which gradually diverges from a throat formed at the point of maximum cross-section of adjacent coils.

3. A strainer comprising a skeleton supporting member and a tubular filter element supported thereby, a coiled filter element including a metal structure comprising a plurality of separate rings each having in cross-section an enlarged rounded end portion and side surfaces which extend convergingly therefrom substantially transversely of the filter axis, adjacent rings of said ribbon structure being arranged in flatwise spaced relationship to provide filtering passages, said side surfaces converging in the direction of flow therethrough from the point of maximum cross-section, the enlarged ends of adjacent rings being in alignment, and the points of maximum cross-section of adjacent rings being substantially aligned and so arranged that the maximum spacing between adjacent rings is of less dimension than the length of the converging side surfaces, thereby providing a Venturi passage having a short inlet portion, and an exit portion which gradually diverges from a throat formed at the point of maximum cross-section of adjacent rings.

4. A strainer comprising a skeleton supporting member including axially spaced rings and circumferentially spaced plates connecting said rings together, and a tubular filter element supported by said supporting member and connected to at least one of said rings, a coiled filter element including a metal structure comprising thin ribbon members each having in cross-section an enlarged rounded end portion and side surfaces which extend convergingly therefrom substantially transversely of the filter axis, adjacent coils of said ribbon structure being arranged in flatwise spaced relationship to provide filtering passages, said side surfaces converging in the direction of flow therethrough from the point of maximum cross-secton, the enlarged ends of adjacent coils being in alignment, and the points of maximum cross-section of adjacent coils being substantially aligned and so arranged that the maximum spacing between adjacent coils is of less dimension than the length of the converging side surfaces, thereby providing a Venturi passage having a short inlet portion, and an exit portion which gradually diverges from a throat formed at the point of maximum cross-section of adjacent coils.

5. A strainer comprising a skeleton supporting member including axially spaced rings and circumferentially spaced plates connecting said rings together, and a tubular filter element supported by said supporting member, a coiled filter element including a metal structure comprising thin ribbon members each having in cross-section an enlarged rounded end portion and side surfaces which extend convergingly therefrom substantially transversely of the filter axis, spacers being provided and disposed on one of said side surfaces, adjacent coils of said ribbon structure being arranged in flatwise spaced relationship to provide filtering passages, said side surfaces converging in the direction of flow therethrough from the point of maximum cross-section, the enlarged ends of adjacent coils being in alignment, and the points of maximum cross-section of adjacent coils being substantially aligned and so arranged that the maximum spacing between adjacent coils is of less dimension than the length of the converging side surfaces, thereby providing a Venturi passage having a short inlet portion, and an exit portion which gradually diverges from a throat formed at the point of maximum cross-section of adjacent coils.

6. A strainer comprising a tubular coiled filter element including a metal structure of thin ribbon members each having in cross-section an enlarged rounded end portion and side surfaces which extend convergingly therefrom substantially transversely of the filter axis, adjacent coils of said ribbon structure being arranged in flatwise spaced relationship to provide filtering passages, said side surfaces converging in the direction of flow therethrough from the point of maximum cross-section, the enlarged ends of adjacent coils being in alignment, and the points of maximum cross-section of adjacent coils being substantially aligned and so arranged that the maximum spacing between adjacent coils is of less dimension than the length of the converging side surfaces, thereby providing a Venturi passage having a short inlet portion, and an exit portion which gradually diverges from a throat formed at the point of maximum cross-section of adjacent coils.

7. A strainer comprising a tubular coiled filter element including a metal structure of thin ribbon members each having a rounded inner end portion and side surfaces which extend therefrom substantially transversely of the filter axis, adjacent coils of said ribbon structure being arranged in flatwise spaced relationship to provide filtering passages, said side surfaces of adjacent coils diverging in the direction of flow therethrough, the inner ends of adjacent coils being in alignment, and the said adjacent coils being substantially aligned and so arranged that the maximum spacing between adjacent coils is of less dimension than the length of the side surfaces, thereby providing a Venturi passage having a short inlet portion, and an exit portion which gradually diverges from a throat formed adjacent to the inner ends of adjacent coils.

JAMES CLARENCE HOBBS.

REFERENCES CITED

The following references are of record in the file of this patent:

UNITED STATES PATENTS

| Number | Name | Date |
|---|---|---|
| 602,488 | Tice et al. | Apr. 19, 1898 |
| 689,934 | Vrooman et al. | Dec. 31, 1901 |
| 765,182 | King | July 19, 1904 |
| 1,411,201 | Barron | Mar. 28, 1922 |
| 1,756,997 | Shurtleff | May 6, 1930 |
| 1,797,399 | Boulade | Mar. 24, 1931 |
| 2,000,490 | Mandahl | May 7, 1935 |
| 2,042,537 | Liddell | June 2, 1936 |
| 2,084,433 | Chorlton | June 22, 1937 |
| 2,137,556 | Young | Nov. 22, 1938 |
| 2,188,643 | Laderer | Jan. 30, 1940 |
| 2,321,207 | Howe | June 8, 1943 |

FOREIGN PATENTS

| Number | Country | Date |
|---|---|---|
| 282,846 | Great Britain | Jan. 5, 1928 |
| 486,186 | Great Britain | May 31, 1938 |
| 114,210 | Australia | Sept. 10, 1929 |